US005523864A

United States Patent [19]
Gaalema et al.

[11] Patent Number: 5,523,864
[45] Date of Patent: Jun. 4, 1996

[54] ANALOG LIQUID CRYSTAL SPATIAL LIGHT MODULATOR INCLUDING AN INTERNAL VOLTAGE BOOSTER

[75] Inventors: Stephen D. Gaalema, Colorado Springs; Mark A. Handschy, Boulder, both of Colo.

[73] Assignee: Displaytech, Inc., Boulder, Colo.

[21] Appl. No.: 187,640

[22] Filed: Jan. 26, 1994

[51] Int. Cl.⁶ ................................................. G02F 1/133
[52] U.S. Cl. .................................... 359/55; 359/59
[58] Field of Search ............................ 359/55, 57, 59, 359/85, 237; 307/38; 348/790

[56] References Cited

U.S. PATENT DOCUMENTS

| | | | |
|---|---|---|---|
| 3,824,003 | 7/1974 | Koda et al. | 350/160 LC |
| 4,938,567 | 7/1990 | Chartier | 350/333 |
| 5,016,982 | 5/1991 | Fergason et al. | 350/331 R |
| 5,021,774 | 6/1991 | Ohwada et al. | 340/811 |
| 5,198,920 | 3/1993 | Gobeli et al. | 359/245 |
| 5,251,051 | 10/1993 | Fujiyoshi et al. | 359/85 |
| 5,325,228 | 6/1994 | Matsubara et al. | 359/249 |

OTHER PUBLICATIONS

Gaalema et al, Analog electro–optic modulators for ferro-electric–liquid–crystal/VLSI spatial light modulators, Feb. 2–4, 1993, SPIE–The International Society for Optical Engineering, vol. 1911, pp. 175–180.

Primary Examiner—Mark Hellner
Attorney, Agent, or Firm—Stephen C. Shear

[57] ABSTRACT

There is disclosed herein a liquid crystal spatial light modulator which is driven y an analog input voltage and which includes, among other components, a layer of liquid crystal material that changes the way in which it acts on light in response to predetermined changes in voltage across the layer, whereby to modulate the light so acted upon, and an arrangement for applying a light modulating voltage across the layer of liquid crystal material and for modulating the voltage during a given modulation period. This latter arrangement includes a non-linear capacitor and a voltage coupling scheme for changing the voltage across the capacitor during the modulation period in a way which changes the capacitance of the capacitor and thereby capacitively couples at least a part of the change in voltage across the capacitor to the layer of liquid crystal material.

16 Claims, 2 Drawing Sheets

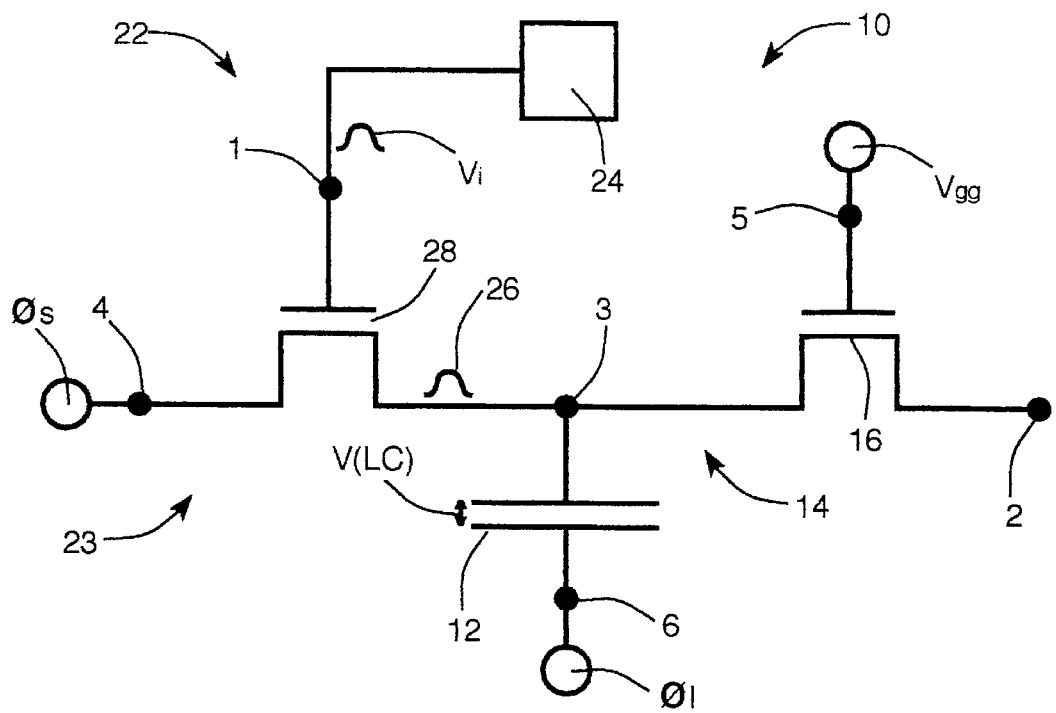
Figure 1
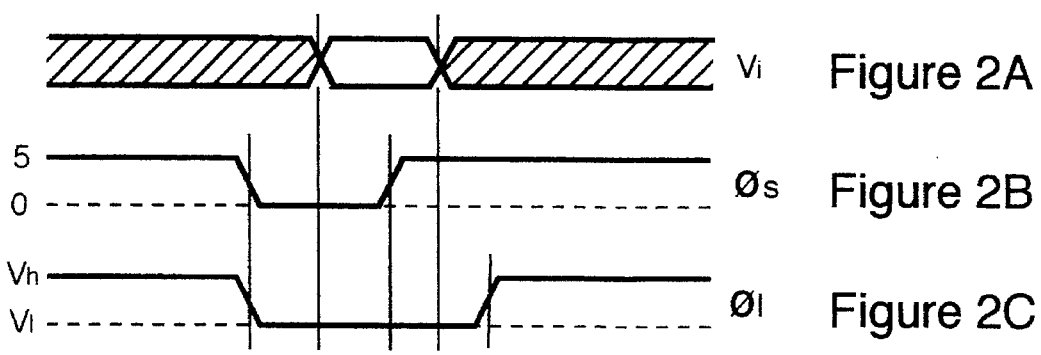

ANALOG LIQUID CRYSTAL SPATIAL LIGHT MODULATOR INCLUDING AN INTERNAL VOLTAGE BOOSTER

GOVERNMENT CONTRACT CLAUSE

This invention was made with Government support under contract N60921-90-C-0260 awarded by the U.S. Navy. The Government has certain rights in this invention.

BACKGROUND OF THE INVENTION

The present invention relates generally to liquid crystal spatial light modulators, and more particularly to active matrix liquid crystal spatial light modulators.

Liquid crystal (LC) light modulators directly atop silicon integrated circuits form the basis of a matrix addressed spatial light modulator (SLM) technology well suited to information display and optical information processing. This combination permits large arrays of compact "smart" pixels that can utilize the extensive repertoire of functionality available in extreme miniature on silicon VLSI (Very Large Scale Integrated) circuits. Devices made in this way can have array sizes up to 128×128 to 1000×1000, depending on the degree of pixel intelligence. They are similar in size and weight to an ordinary integrated circuit, and typically operate on low voltage (5 volt) power supplies, usually consuming less than 100 mW. The LC modulators of these arrays operate at conventional CMOS voltage levels, with update times as short as 100 microseconds and efficient, high contrast modulation over wide wavelength ranges.

One typical active matrix liquid crystal spatial light modulator in the prior art includes, among other components, a layer of liquid crystal material, for example ferroelectric liquid crystal material, which changes the way in which it acts on light in response to predetermined changes in voltage across the layer, whereby to modulate the light so acted upon. This layer of liquid crystal material is functionally divided into an array of adjacent pixel segments arranged in a predetermined way, typically in a matrix of rows and columns. An addressing scheme is provided for applying a voltage across this array of adjacent pixel segments and for individually modulating the voltage across each pixel segment in a controlled manner in order to modulate the light acted upon by the pixel segments in a correspondingly controlled way. In this typical active matrix liquid crystal spatial light modulator of the prior art, each pixel segment includes associated circuitry for modulating the voltage across the particular pixel segment, that is for changing its voltage, in response to a particular data or address voltage at the input of the circuitry.

A particular problem associated with the prior art device described immediately above resides in the fact that its addressing scheme is voltage limited, that is, the data or addressing voltages must be kept less than a maximum, for example 5 volts which is the standard in many integrated circuits. This is a result of many reasons including dissipation problems associated with such devices.

As a result of this data or addressing voltage limitation just recited, the maximum voltage change that can possibly appear across the array of adjacent pixel segments making up the typical prior art active matrix liquid crystal spatial light modulator is correspondingly limited. That is, in such devices of the prior art, because the data or addressing voltage, is by design limited to, for example, at most 5 volts, the voltage changes across the individual pixel segments (for modulating these segments) have been correspondingly limited to voltage changes somewhat smaller than the maximum data or addressing voltage levels, for example, somewhat less than 5 volts. Devices of the type to which the present invention is directed, for example active matrix ferroelectric liquid crystal spatial light modulators, could be speeded up and thereby improved upon if the voltage change across the individual pixel segments could be increased. As will be seen hereinafter, the present invention achieves just that by teaching a way to increase the maximum voltage change across each pixel segment without having to increase the data or addressing voltage.

SUMMARY OF THE INVENTION

As will be described in more detail hereinafter, there is disclosed herein a liquid crystal spatial light modulator which is driven by an analog input voltage and which includes means for defining a layer of liquid crystal material that changes the way in which it acts on light in response to predetermined changes in voltage across the layer, whereby to modulate the light so acted upon. This liquid crystal spatial light modulator includes an arrangement designed in accordance with the present invention for applying a light modulating voltage across the layer of liquid crystal material and for modulating that voltage during a given modulation period in order to modulate the light acted upon by the liquid crystal material. This arrangement includes a non-linear capacitor, for example an MOS capacitor or the like, which has one side electrically connected with one side of the layer of liquid crystal material such that the light modulating voltage across the layer at any given point in time during its modulation period is a function of the voltage across the capacitor at that time. The arrangement also includes voltage coupling means for changing the voltage across the capacitor during the modulation period in a way which changes the capacitance of the capacitor and thereby capacitively couples at least a part of the change in voltage across the capacitor to the layer of liquid crystal material. In this way, as will be seen, the maximum light modulating voltage swing across layer of liquid crystal material can be amplified without increasing the maximum data or addressing voltage used by the overall arrangement to modulate the liquid crystal material.

In a specific embodiment of the present invention, the spatial light modulator is an active matrix liquid crystal spatial light modulator. This active matrix device includes a layer of liquid crystal material, specifically ferroelectric liquid crystal, which is functionally divided in to an array of adjacent pixel segments arranged in a predetermined way and means providing analog data or addressing signals for modulating the various pixel segments.

DESCRIPTION OF THE DRAWINGS

The present invention will be described in more detail in conjunction with the drawings, wherein:

FIG. 1 schematically illustrates a liquid crystal spatial light modulator designed in accordance with the present invention and it also schematically illustrates a one-pixel segment of an overall active matrix liquid crystal spatial light modulator designed in accordance with the present invention;

FIGS. 2a–2c diagrammatically illustrate certain operational characteristics of the spatial light modulator of FIG. 1;

DETAILED DESCRIPTION

Figure 3:
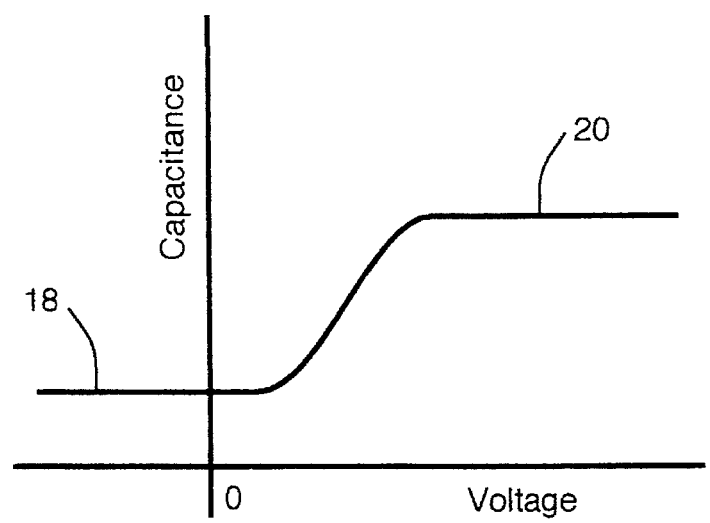
FIG. 3 graphically depicts capacitance as a function of voltage in a non-linear capacitor forming part of the spatial light modulator of FIG. 1.

Turning now to the drawings, wherein like components are designated by like reference numerals throughout the various figures, attention is first directed to FIG. 1. As stated immediately above, FIG. 1 diagrammatically illustrates either a liquid crystal spatial light modulator designed in accordance with the present invention, or a pixel segment of an overall active matrix liquid crystal spatial light modulator, also designed in accordance with the present invention. For purposes of the immediate discussion, it will be assumed that FIG. 1 depicts an overall liquid crystal spatial light modulator which is generally indicated by the reference numeral 10. Liquid crystal spatial light modulator 10 includes, among other components, a layer 12 of liquid crystal material which changes the way in which it acts on light in response to predetermined changes in voltage across the layer, whereby to modulate the light so acted upon. The spatial light modulator also includes an arrangement 14 for applying a light modulating voltage V(LC) across layer 12 and for modulating voltage V(LC) during a given modulation period in order to modulate the light acted upon by the liquid crystal material during the light modulation period. While not shown, it is to be understood that overall spatial light modulator 10 includes other, conventional components which do not form part of the present invention per se. For purposes of brevity those other components, all of which are obvious to those skilled in the art, will not be described herein.

In a preferred embodiment of the present invention, the liquid crystal material making up layer 12 is deformable-helix ferroelectric liquid crystal material as described in U.S. application Ser. No. 07/832,414 (incorporated herein by reference) and the thickness of this layer is 1 μm. This material is especially suitable with the present analog driven circuitry since it responds well in an analog way, that is it provides continuous variation in light modulation in response to continuous changes in electrical address (i.e. analog) signals. However, more conventional binary liquid crystal materials such as surface stabilized ferroelectric liquid crystals can be varied in an analog way in accordance with the present invention. It is to be understood that the present invention is not limited either to the liquid crystal materials recited above or the thickness recited. Examples of other liquid crystal materials that could be utilized are electroclinic and nematic.

Still referring to FIG. 1, drive arrangement 14 will now be described in more detail. At the outset, it is to be understood that the individual components making up this arrangement are not per se new but rather can be provided by those with ordinary skill in the art. In a preferred embodiment, these components are realized as a silicon integrated circuit provided in accordance with established processing technique which use, for example, VLSI (very large scale integration) implementations. With this in mind, arrangement 14 is shown including a non-linear capacitor 16 which, in the embodiment depicted, is actually a MOS transistor having its source connected to one side of liquid crystal layer 12 at node 3. With the liquid crystal layer 12 and capacitor 16 connected together in this way, the light modulating voltage V(LC) across the layer at any given point in time during its modulation period is a function of the voltage across capacitor 16 at that time.

In addition to capacitor 16, overall arrangement 14 includes a voltage coupling scheme which, as will be seen, functions as a fill and spill circuit. This scheme serves to change the voltage across the capacitor during the modulation period in a way which changes the capacitance of the capacitor and thereby capacitively couples at least a part of the change in voltage across the capacitor to the layer 12 of liquid crystal material. In this regard, it is important to remember that the capacitor 16 is a non-linear capacitor and, therefore, its capacitance varies as a function of voltage in the manner generally illustrated in FIG. 3. As seen there, as the voltage across the capacitor changes there is a sudden jump from a relatively low capacitance indicated generally at 18 to a relatively high capacitance indicated at 20. While it is known that non-linear capacitors of the MOS type or the like operate in this manner, the present invention takes advantage of this characteristic to amplify or boost the change in voltage V(LC) across layer 12 by changing the capacitance during the modulation period, as will be seen hereinafter.

The voltage coupling scheme just recited generally is shown in FIG. 1 including a pixel addressing circuit 22 having suitable and readily providable means generally indicated at 24 for presenting a variable analog input voltage at node 1 and a drive circuit 23 responsive to this analog voltage during the modulation period of the spatial light modulator for applying a variable addressing voltage 26 to node 3. The analog input voltage varies from a high voltage level, for example +5 volts, to a low level, for example +1 volt. The drive circuit is shown in FIG. 1 including a switch 28 which is formed from a transistor connected in the manner shown. The drive circuit also includes a variable address drive voltage $\phi_s$ which swings between a high voltage, for example +5 volts, and a low voltage, for example 0 volts. At any given time during the modulation period, the relationship between the analog input voltage at node 1 and the variable voltage $\phi_s$ at node 4 determines whether or not switch 28 is on or off. As the voltage $\phi_s$ falls below one threshold of the analog input voltage $V_i$ at any given point in time, switch 28 turns on, thereby applying addressing voltage 26 to node 3 from voltage $\phi_s$. When the voltage $\phi_s$ is driven upwards to within at least one threshold of the analog input voltage, again at any given point in time, the switch 28 turns off, thereby isolating addressing voltage 26 appearing at node 3 from node 4. It should be clear that the level of addressing voltage 26 depends upon the level of the analog voltage Vi at the given point in time, the larger $V_i$, is the larger that voltage 26 at node 3 will be.

In addition to addressing circuit 22 and drive circuit 23, the overall capacitor coupling scheme is shown in FIG. 1 including a fixed voltage $V_{gg}$, for example 4 volts, applied to the gate or plate of capacitor 16 at node 5 and a variable capacitance coupling voltage $\phi_l$ applied to the liquid crystal layer 12 at node 6 which is on the opposite side of the liquid crystal layer as node 3. As will be seen hereinafter, voltage $\phi_l$ is driven between a high voltage level, for example +8 volts, and a low level, for example −2 volts.

Having described overall liquid crystal spatial light modulator 10 from a structural standpoint, attention is now directed to the way in which it operates in order to modulate light acted upon by the liquid crystal layer. In this regard, for purposes of discussion, the following assumptions will be made. First, it will be assumed initially that the analog input voltage $V_i$ varies between +1 volt and +5 volts in order to ultimately cause the liquid crystal layer 12 to vary between its darkest level and its lightest level. Second, it will be assumed that the voltage $\phi_s$ is initially high, specifically +5 volts and, therefore, the switch 28 is initially off since the voltage $\phi_s$ cannot be a threshold drop below the analog voltage $V_i$, even if the latter is at its highest voltage level (+5 volts). Third, it will be assumed that the voltage $\phi_l$ is initially at its high level. Some of these assumptions are diagrammatically illustrated in FIGS. 2a–2c. Specifically, FIG. 2a graphically illustrates the application of analog voltage $V_i$ at node 1. The light portion of this graph shows when the analog voltage is actually used during a given modulation period, as will be seen. FIG. 2b graphically depicts the voltage $\phi_s$ as a function of time and FIG. 2c, similarly, depicts the voltage $\phi_l$ as a function of time.

With the forgoing assumptions in mind, while the analog voltage $V_i$ is applied to gate of non-conducting switch 28 and the voltage $V_{gg}$ is applied to the gate of capacitor 16, the voltage $\phi_s$ is driven low, as indicated in FIG. 2b. When this voltage falls below one threshold of analog input voltage $V_i$, the switch 28 turns on, causing the low voltage $\phi_s$ to be applied through the switch to node 3 as addressing voltage 26, thereby bringing the node 3 and that side of liquid crystal layer 12 low. This, in turn, charges (fills) the capacitance of capacitor 16. While $\phi_s$ is low, the opposite side of the liquid crystal layer, that is its node 6, is driven to an even lower voltage by voltage $\phi_l$, as illustrated in FIG. 2c. This results in a negative reset voltage across the liquid crystal layer 12. Thereafter, the voltage $\phi_s$ is driven high as illustrated in FIG. 2b. This causes the node 3 to follow it up, causing the capacitor 16 to discharge (spill) until switch 28 stops conducting when voltage $\phi_s$ comes within one threshold drop of the analog input voltage $V_i$. This leaves a charge on capacitor 16 that depends on the relationship between $V_{in}$ and $V_{gg}$. In particular, with $V_{gg}$ being fixed, the charge on capacitor 16 decreases with increases in $V_{in}$. In this regard, the overall coupling scheme functions as a fill and spill circuit, as stated previously.

With node 3 now connected to capacitor 16 but otherwise isolated since switch 28 is off, voltage $\phi_l$ is driven high, as illustrated in FIG. 2c, which in turn raises the voltage on node 3. As node 3 comes within one threshold of the voltage $V_{gg}$, the capacitance of capacitor 16 decreases, thereby causing almost all of its charge to be coupled onto liquid crystal layer 12. Thus, the resulting voltage on node 3 depends on the amount of charge stored in capacitor 16. If little charge were stored, as would result if $V_i$ were equal to or greater than $V_{gg}$, then little charge could flow onto liquid crystal layer 12, and node 3 would follow node 6 as $\phi_l$ is driven high (i.e. the final state would still have negative voltage across liquid crystal layer 12). If a large amount of charge were stored, as would result if $V_i$ were just one threshold drop above the low level of $\phi_s$, then a large amount of charge could flow onto liquid crystal layer 12, and the voltage at node 3 would change only little as $\phi_l$ went high (i.e. the final state would have a large positive voltage across liquid crystal layer 12). Intermediate voltage levels across the liquid crystal could be reached by storing intermediate amounts of charge on capacitor 16, as would result if $V_i$ had a value intermediate between $V_{gg}$ and one threshold drop above the low level of $\phi_s$. In this way, the peak to peak voltage swing across liquid crystal layer 12 is amplified or boosted to a level larger than the maximum voltage swing of either the analog input voltage $V_i$ or the maximum addressing voltage 26.

Figure 4:
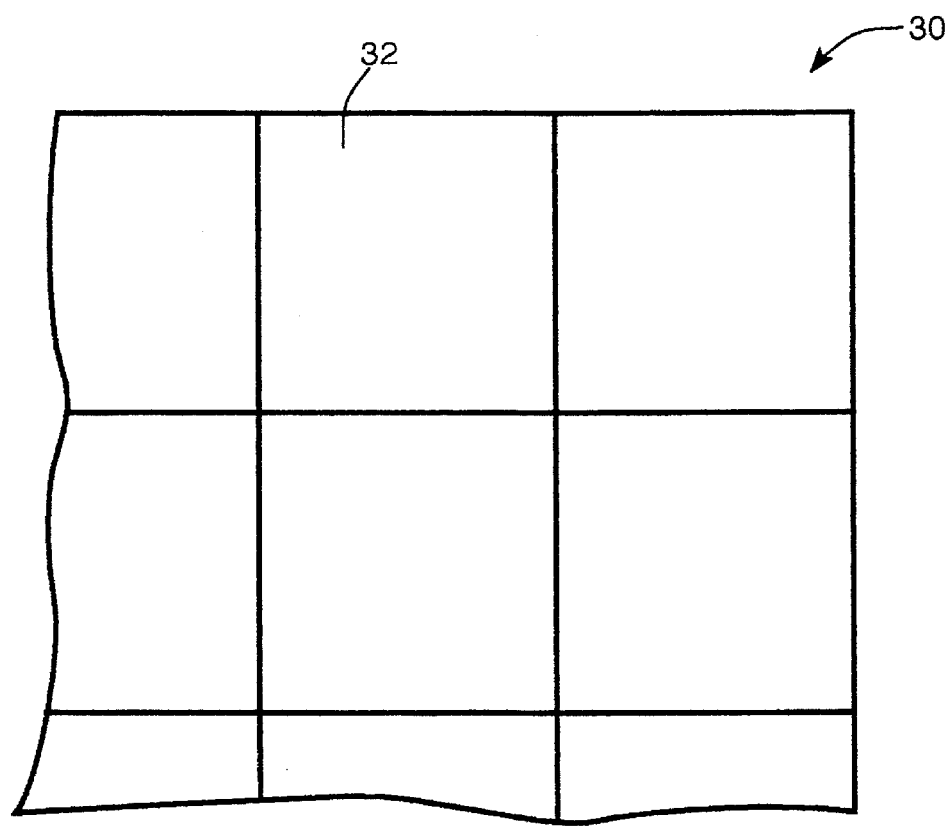
FIG. 4 diagrammatically illustrates part of an overall active matrix liquid crystal spatial light modulator including individual pixelated segments corresponding to the one illustrated in FIG. 1, the pixelated segments being arranged in a matrix of rows and columns.

Having described liquid crystal spatial light modulator 10, both structurally and operationally, attention in now directed to FIG. 4 which illustrates part of an overall active matrix liquid crystal spatial light modulator 30 which, like modulator 10, includes a corresponding liquid crystal layer. This liquid crystal layer is functionally divided into an array of adjacent pixel segments 32 arranged in a matrix of rows and columns. While not shown, each pixel segment 32 includes its own arrangement 14 as described above.

Having described liquid crystal spatial light modulators 10 and 30 and the way in which they operate, it is to be understood that the present invention is not limited to the particular circuitry making up these spatial light modulators. For example, the present invention is not limited to the particular voltage levels recited. What is important is that the overall spatial light modulator have the capability to boost the voltage across the liquid crystal material without having to boost the analog input voltage $V_i$ or the addressing drive voltage $\phi_s$. This is accomplished in accordance with the present invention by providing voltage coupling means for charging the voltage across capacitor 16 during the modulation period of its associated liquid crystal layer or pixel segment in a way which changes the capacitance of capacitor 16 and thereby capacitively couples at least a part of the change in the voltage across the capacitor to its associated liquid crystal layer or pixel segment.

What is claimed is:

1. An active matrix liquid crystal spatial light modulator which is driven by an analog input voltage, said spatial light modulator comprising:

(a) means for defining a layer of liquid crystal material which changes the way in which it acts on light in response to predetermined changes in voltage across the layer, whereby to modulate the light so acted upon, said layer of liquid crystal material being functionally divided into adjacent pixel segments arranged in a predetermined way; and (b) means for applying a voltage across the adjacent pixel segments of said layer of liquid crystal material and for individually modulating the voltage across each pixel segment during any given modulation period, said pixel modulating means including (i) an array of non-linear capacitors, each of which has one side electrically connected with one side of an associated one of the adjacent pixel segments of said layer of liquid crystal material such that the voltage across each of said pixel segments at any given point in time during its modulation period is a function of the voltage across its associated capacitor at that time, and (ii) voltage coupling means responsive to an analog input voltage for changing the voltage across any given capacitor during the modulation period of its associated pixel segment in a way which changes the capacitance of the given capacitor and capacitively couples at least a part of the change in voltage across the given capacitor to its associated pixel segment such that the voltage across that pixel segment in response to said analog input voltage can be greater than the analog input voltage without increasing the analog input voltage.

2. A spatial light modulator according to claim 1 wherein said voltage coupling means for changing the voltage across any given capacitor includes pixel addressing means including means for providing said analog input voltage and drive means responsive to said analog voltage for applying a variable addressing voltage to said one side of the given capacitor during the modulation period of the pixel segment associated with that capacitor, said variable addressing voltage having a maximum voltage level which depends on the voltage level of said analog voltage during the modulation period, and said analog voltage having a maximum level which is less than the maximum change in voltage capacitively coupled from the capacitor to its associated pixel segment during the modulation period of the latter.

3. A spatial light modulator according to claim 2 wherein said drive means includes means for providing a changing addressing voltage and switch means having on and off states and connected to said analog voltage providing means for applying said variable addressing voltage to said one side of the given capacitor depending on the maximum voltage level of said analog voltage during the modulation period of the pixel segment associated with the given capacitor.

4. A spatial light modulator according to claim 3 wherein, during the modulation period of a given pixel segment associated with a particular capacitor and after the variable addressing voltage has been applied to that capacitor, said switching means serves to electrically isolate the variable address voltage at said particular capacitor from said means for providing the variable address voltage.

5. A spatial light modulator according to claim 4 wherein said voltage coupling means includes means for applying a fixed reference voltage to the side of each capacitor opposite its one side.

6. A spatial light modulator according to claim 4 wherein said voltage coupling means includes means for applying a changing liquid crystal drive voltage to the side of each of said pixel segments opposite its one side.

7. A spatial light modulator according to claim 6 wherein, during the modulation period of a given pixel segment associated with a particular capacitor, the voltage coupling means capacitively couples at least some of the voltage from that particular capacitor to that given pixel segment by (i) applying said fixed reference voltage to said opposite side of said particular capacitor, (ii) applying said analog voltage to said switching means, (iii) causing said switching means to turn on for applying said addressing voltage to said one side of the particular capacitor by driving said addressing voltage low, whereby to cause the capacitance of said particular capacitor to go high, (iv) while the addressing voltage is low, maintaining the liquid crystal drive voltage associated with the particular capacitor even lower, whereby to result in a negative reset voltage across the pixel segment associated with said particular capacitor, (v) thereafter driving said addressing voltage high, causing said particular capacitor to discharge until said addressing voltage comes within one threshold drop of the associated analog voltage which causes said switch means to turn off, and (vi) driving said liquid crystal drive voltage sufficiently high to cause the capacitance of said particular capacitor to go low so as to capacitively couple at least a part of the charge on the particular capacitor to its associated pixel segment.

8. In a liquid crystal spatial light modulator which is driven by an analog input voltage and which includes means for defining a layer of liquid crystal material which changes the way in which it acts on light in response to predetermined changes in voltage across the layer, whereby to modulate the light so acted upon, an arrangement for applying a voltage across said layer of liquid crystal material and for modulating said voltage during a given modulation period, said arrangement comprising:

(a) a non-linear capacitor which is electrically connected in series with said layer of liquid crystal material such that the voltage across said layer at any given point in time during its modulation period is a function of the voltage across said capacitor at that time, and (b) voltage coupling means for changing the voltage across said capacitor during the modulation period in a way which changes the capacitance of the capacitor and capacitively couples at least a part of the change in voltage across the capacitor to its associated pixel segment such that the voltage across that pixel segment in response to said analog input voltage can be greater than the analog input voltage without increasing the analog input voltage.

9. An arrangement according to claim 8 wherein said voltage coupling means for changing the voltage across said capacitor includes pixel addressing means including means for providing an analog voltage and drive means responsive to said analog voltage for applying a variable addressing voltage to said one side of the given capacitor during the modulation period of the liquid crystal layer, said variable addressing voltage having a maximum voltage level which depends on the voltage level of said analog voltage, and said analog voltage having a maximum level which is less than the maximum change in voltage capacitively coupled from the capacitor to said liquid crystal layer during the modulation period of the latter.

10. An arrangement according to claim 9 wherein said drive means includes means for providing a changing addressing voltage and switch means having on and off states connected to said analog voltage providing means for applying said variable addressing voltage to said one side of the capacitor depending on the maximum voltage level of said analog voltage during the modulation period of the liquid crystal layer.

11. An arrangement according to claim 10 wherein, during the modulation period of the liquid crystal layer and after the variable addressing voltage has been applied to the capacitor, said switching means serves to electrically isolate the variable address voltage at the capacitor from said means for providing the variable address voltage.

12. An arrangement according to claim 11 wherein said voltage coupling means includes means for applying a fixed reference voltage to the side of the capacitor opposite its one side.

13. An arrangement according to claim 12 wherein said voltage coupling means includes means for applying a changing liquid crystal drive voltage to the side of the liquid crystal layer opposite its one side.

14. An arrangement according to claim 13 wherein, during the modulation period of the liquid crystal layer, the voltage coupling means capacitively couples at least some of the voltage from the capacitor to the liquid crystal layer by (i) applying said fixed reference voltage to said opposite side of said capacitor, (ii) applying said analog voltage to said switching means, (iii) causing said switching means to turn on for applying said addressing voltage to said one side of the capacitor by driving said addressing voltage low, whereby to cause the capacitance of the capacitor to go high, (iv) while the addressing voltage is low, maintaining the liquid crystal drive voltage even lower, whereby to result in a negative reset voltage across the liquid crystal layer, (v) thereafter driving said addressing voltage high, causing said capacitor to discharge until said addressing voltage comes within one threshold drop of the analog voltage which causes said switch means to turn off, and (vi) driving said liquid crystal drive voltage sufficiently high to cause the capacitance of said capacitor to go low so as to capacitively couple at least a part of the charge on the capacitor to the liquid crystal layer.

15. A spatial light modulator according to claim 1 wherein said voltage coupling means includes means for applying a voltage of varying magnitude to the side of each of said associated pixel segments of said layer of liquid crystal material opposite said one side of each pixel segment during the modulation period of each associated pixel segment so as to change the capacitance of the given capacitor and capacitively couple at least a part of the change in voltage across the capacitor to its associated pixel segment such that the voltage across that pixel segment in response to said analog input voltage can be greater than the analog input voltage without increasing the analog input voltage.

16. An arrangement according to claim 8 wherein said voltage coupling means includes means for applying a voltage of varying magnitude to the side of each of said associated pixel segments of said layer of liquid crystal material opposite said one side of each pixel segment during the modulation period of each associated pixel segment so as to change the capacitance of the given capacitor and capacitively couple at least a part of the change in voltage across the capacitor to its associated pixel segment such that the voltage across that pixel segment in response to said analog input voltage can be greater than the analog input voltage without increasing the analog input voltage.

* * * * *